(No Model.)
A. SHEPARD.
COFFEE MILL.
No. 349,062. Patented Sept. 14, 1886.
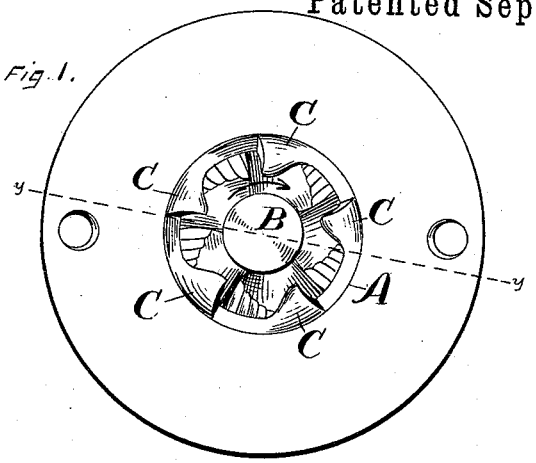
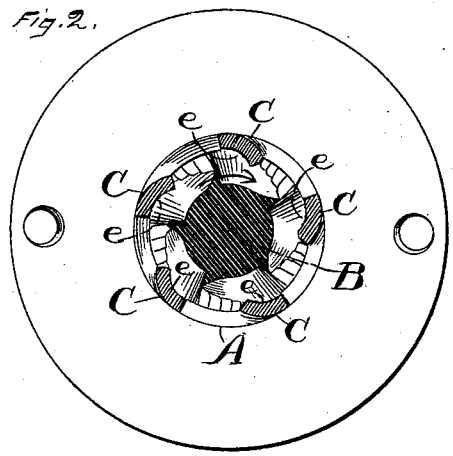
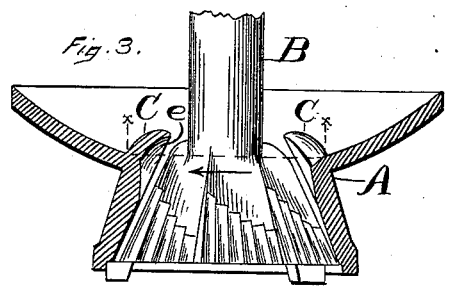
Witnesses:
John Edwards Jr.
W. H. Whiting.
Inventor.
Amos Shepard
By James Shepard
Atty.

UNITED STATES PATENT OFFICE.

AMOS SHEPARD, OF PLANTSVILLE, CONNECTICUT.

COFFEE-MILL.

SPECIFICATION forming part of Letters Patent No. 349,062, dated September 14, 1886.

Application filed May 24, 1886. Serial No. 203,064. (No model.)

*To all whom it may concern:*

Be it known that I, AMOS SHEPARD, a citizen of the United States, residing at Plantsville, in the county of Hartford and State of Connecticut, have invented certain new and useful Improvements in Coffee-Mills, of which the following is a specification.

My invention relates to an improvement in coffee-mills, the object of which is to provide suitable means for cracking up the coarse grains or kernels preparatory to the finer work of the mill in grinding.

In the accompanying drawings, Figure 1 represents a plan view of my grinding-shell and a grinding-nut. Fig. 2 represents a horizontal section of the same on line $x\,x$ of Fig. 3. Fig. 3 represents a central vertical section of the grinding-shell, with a side elevation of a nut.

Only the grinding shell and nut are shown, as I deem these sufficient to illustrate my improvement.

All parts of the mill may be of any ordinary construction, except the part hereinafter particularly pointed out as my improvement.

Upon the upper edge of the grinding-shell A, and projecting upwardly and inwardly, I have formed a series of teeth, as at C. The grinding-nut B is provided with a series of projecting ribs or teeth, so that when it is revolved the grains or kernels in the mill will fall between the teeth C and be carried by the teeth of the nut against the inner faces of said teeth C, and be thus broken up and prepared for the finer grinding in passing through the mill. It will be noticed that the teeth are hollowed out on their inner faces, as at $e$, presenting an inward curve at the top when viewed in side view, as at the left-hand side of Fig. 3, and also presenting an inward curve when viewed in horizontal section, as in Fig. 2, forming what may be termed "doubly-curved hooked teeth," the object of which is to catch and hold the coffee or other grains or kernels, and crack or break them as they are pressed against said teeth by the ribs of the grinding-nut B.

Aside from the upwardly-projecting and doubly-curved hooked teeth C, which constitute my improvement, the grinding-shell is old, while the grinding-nut is of an ordinary form. It should also be noticed that said teeth project from the upper inner edge of the operative surface of the shell.

I am aware that a prior patent for a bone-mill shows a shell with attachable and detachable teeth made of steel and brought to a straight cutting-edge, the face under the cutting-edge being slightly concave. These teeth were not set at the upper inner edge of the operative surface of the grinding-shell, and the teeth showed no inwardly-curved portion at the top when viewed in side view. Such a mill is hereby disclaimed.

What I claim as my invention, and desire to secure by Letters Patent, is—

The combination of a grinding-nut with the shell A, having the doubly-curved hooked teeth at the upper inner edge of the operative surface of said shell, substantially as described, and for the purpose specified.

AMOS SHEPARD.

Witnesses:
EDWIN N. WALKLEY,
EDWIN G. LEWIS.